Dec. 18, 1956    J. SOFFE    2,774,546
FISHING REEL
Filed March 31, 1953    2 Sheets-Sheet 1
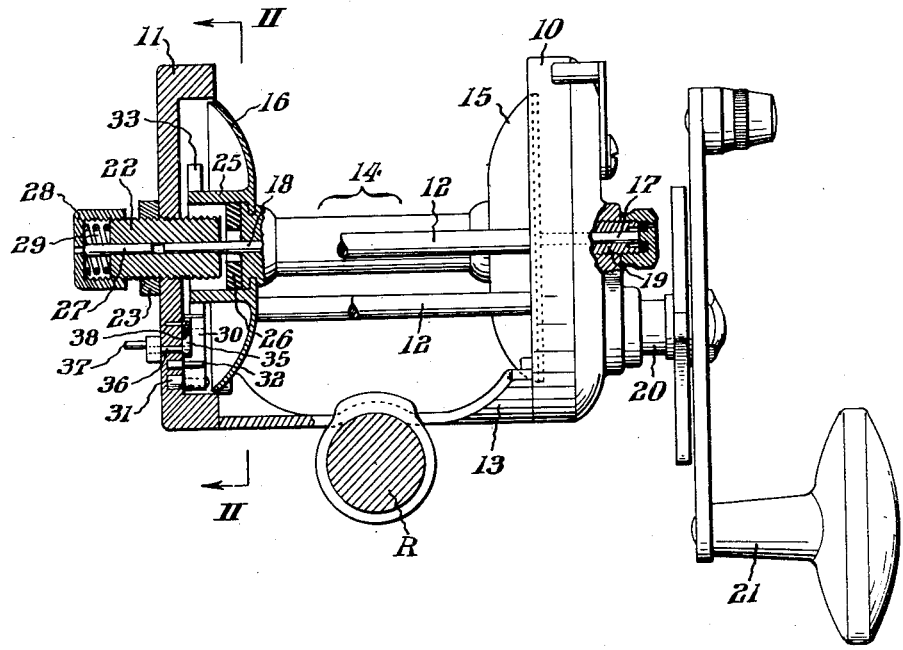
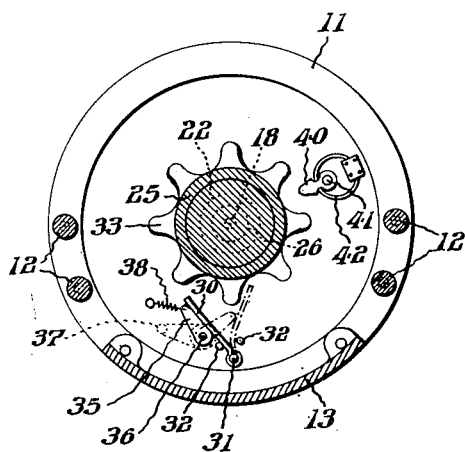
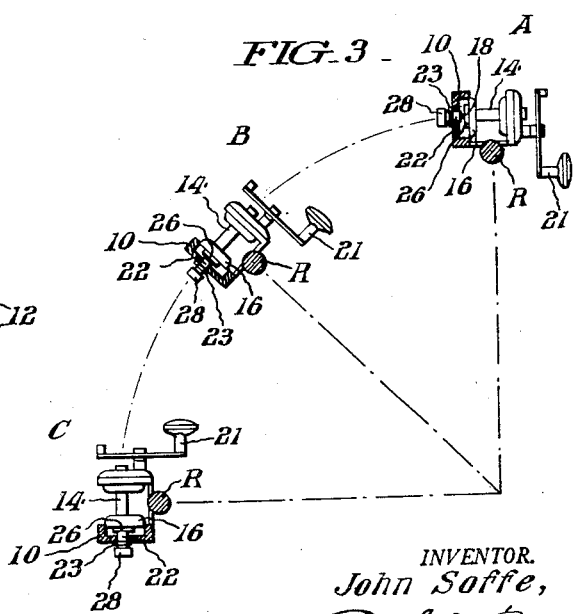
INVENTOR.
John Soffe,
BY Paul & Paul
ATTORNEYS Dec. 18, 1956 J. SOFFE 2,774,546
FISHING REEL
Filed March 31, 1953 2 Sheets-Sheet 2

INVENTOR.
John Soffe,
BY Paul & Paul
ATTORNEYS.

United States Patent Office 2,774,546
Patented Dec. 18, 1956

2,774,546

FISHING REEL

John Soffe, Pompano Beach, Fla.

Application March 31, 1953, Serial No. 345,945

3 Claims. (Cl. 242—84.5)

This invention relates to fishing reels, particularly to reels of the type adapted to be mounted on casting rods.

In the use of fishing reels of the kind referred to, upon casting of the bait or of the decoys, the spools over-run due to momentum previously induced in them by pull of the weights and the force of the cast. As a consequence, considerable of the coils of the lines adjacent the surface of the winding expand circumferentially of the spool and become snarled or entangled with each other. Correction of this condition is not only painstaking, entails back winding and, moreover, is annoying and time consuming.

The chief aim of my invention is to overcome the above mentioned difficulty. This objective is realized in practice, as hereinafter more fully set forth, through provision in connection with such reels, of a simple spool restraining or retarding means which, with the rod held in one position, the spool is permitted to rotate freely during certain phases of casting, and which upon partial turning of the rod by a wrist movement at the moment of casting, becomes effective under the influence of gravity, to restrain rotation of the spool during other phases and so prevents the spool from over-running.

Another object of my invention is to attain the foregoing advantages in a spool retarding means which is susceptible either of ready attachment to existent reels, or of incorporation incident to the manufacture of such reels without necessitating any radical changes in their basic construction or interfering with their normal mode of operation.

Other objects and attendant advantages will appear from the following detailed description of the attached drawings wherein:

Fig. 1 is a view partly in front elevation and partly in axial section of a fishing reel with a built in spool retarding means conveniently embodying my invention.

Fig. 2 is a cross section taken as indicated by the angled arrows II—II in Fig. 1.

Fig. 3 is a diagrammatic view showing the manner in which the spool retarding means is caused to function by a wrist movement of the fishing rod.

Figure 4:
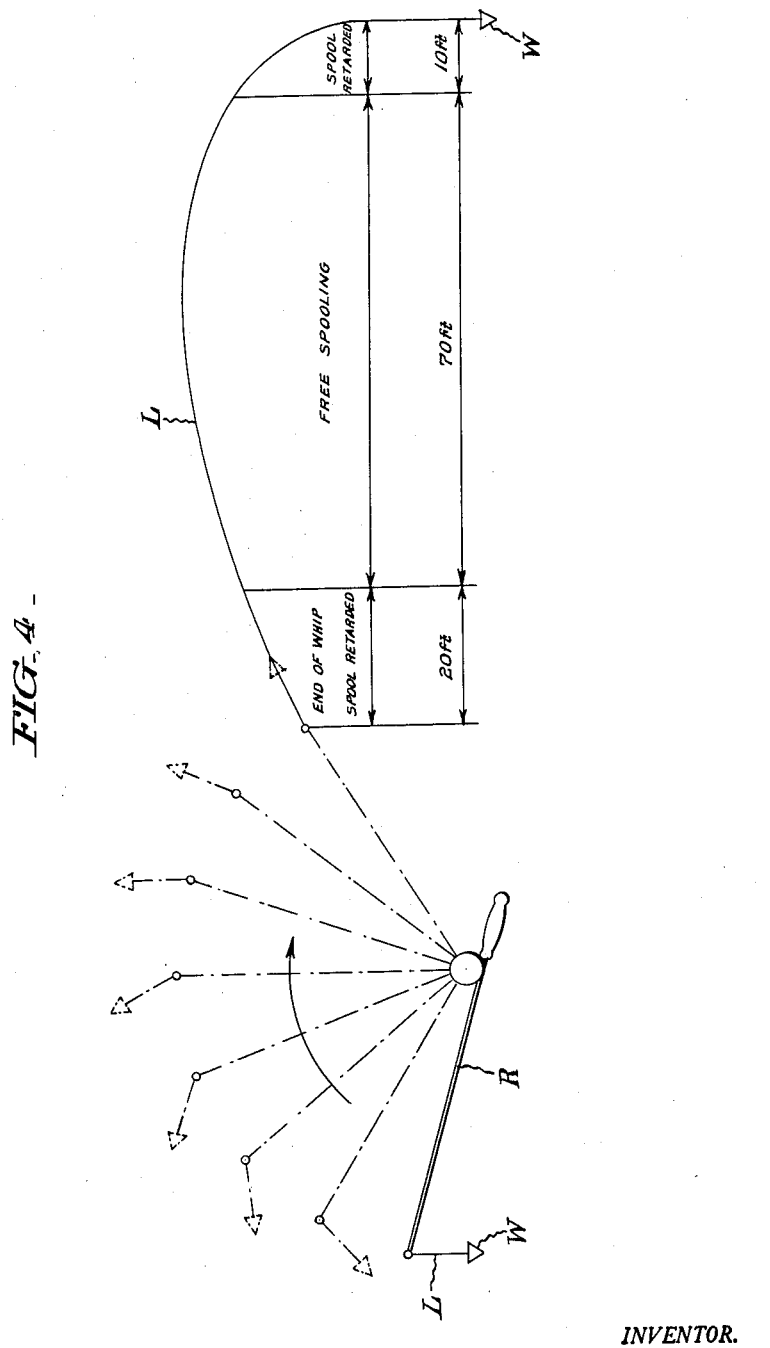
Fig. 4 is a diagrammatic view showing how the reel is intended to be used in casting.

With more specific reference first to Figs. 1 and 2 of these illustrations, the numerals 10 and 11 designate the laterally-spaced axially recessed side members of the reel frame which are united, as ordinarily, by a plurality of tie bars 12 and which are secured to the bracket member 13 whereby the reel is fastened to the casting rod R. The winding spool 14 is disposed between the side members 10 and 11 with its outwardly convexed flanges 15 and 16 extending partway into the hollows of said members, and has trunnions 17 and 18 secured axially into opposite ends thereof. Trunnion 17 is journalled in a bearing 19 set into side member 10 at the center and is connected, as usual, through an enclosed train of gears (not illustrated) with a shaft 20 carrying the hand crank 21 by which the spool 14 is adapted to be driven in winding up the fishing line. The other trunnion 18 is journalled in a threaded bushing 22 which is axially adjustable in the side member 11 and which is secured against accidental displacement after adjustment by a clamp nut 23. Recessed into a hub projection 25 of spool 14 is a friction element 26 in the form of a disk of asbestos or other suitable material or composition which is adapted to coact with the inner end surface of bushing 22 in retarding rotation of the spool in a manner later on explained. As shown, bushing 22 is so adjusted as to provide a slight clearance between the inner end thereof and the disk 26 to permit spool 14 to shift endwise by a corresponding amount.

Now it will be noted that trunnion 18 extends only partway into bushing 22 and that the remainder of the bore in the latter is occupied in part by a pin 27. Screw engaged upon the outer end of bushing 22 is a cap 28 and in compression between said bushing end and said cap is an enclosed helical spring 29. Pin 27 is of such length as to provide a clearance interval between its inner end and the confronting end of trunnion 18.

For the purpose of overcoming the inertia of the spool to counteract the snap of the whip at the time of casting, I have provided means for initiating its rotation. As shown, this means comprises a spring finger 30 which is secured to a stud 31 at the inner face of side member 10 and engaged adjacent the point of anchorage between two stop studs 32, and which is adapted to act upon gear teeth 33 on hub projection of spool 14. A cam projection 35 at the inner end of a pin shaft 36 extends through side member 11 and has a small setting lever 37 at its outer end. Pressing of setting lever 37 clockwise in Fig. 2 will be attended by movement of cam projection 35 from the full line position to the broken line position as a result of which spring finger 30 will be flexed by said projection as shown in broken lines. After flexing of finger 30, the thumb of the hand in which rod R is held is used to temporarily prevent rotation of spool 14 in preparation for the casting before release of lever 37. Upon subsequent release of lever 37, the tension spring at 38 acts to withdraw cam projection 35 from engagement with spring finger 30. A click 40 pivoted at 41 on side member 10 and normally maintained by a loop spring 42 in the radial position in which it is shown, projects into the path of the gear teeth 33 on element 26.

With the reel position horizontally as at A it will be seen that the spool 14 will run free to pay out the line. Upon turning the rod R through the position B to the position C to bring the axis of the reel vertical, the spool will shift axially under the influence of gravity until the friction disk 26 contacts the inner face of bushing 22.

In making a cast for example through a distance of a hundred feet as graphically illustrated in Fig. 4, the manner of controlling the action of the reel is as follows: In preparation for the cast with the rod R held as shown in full lines in Fig. 4, the reel is positioned as at C in Fig. 3 for retardation of spool 14, and the spring finger 30 is cocked and held in the broken line position of Fig. 2. All being now in readiness, the rod is whipped and the spring finger 30 released to start the spool in rotation under drag to permit paying out of the fishing line L as the dangling end of the latter gradually straightens into alignment with the rod under the pull of the weight W. Shortly after the end of the swing is reached and about twenty feet of the line L is payed out, the rod is given a twist by a wrist motion of the holding hand to bring the reel to the position A in Fig. 3, as a consequence of which the spool is released from restraint to permit more rapid paying out of the line. Then, just before the weight W starts to fall, i. e., at about ten feet in advance of that point, the rod is given a partial turn in the reverse direction by an opposite wrist movement to restore the reel to the position C in Fig. 3, for restraint of the spool to decelerate the pay out rate of the line L. In this way, it will be seen that, through my invention, paying out of the line is under definite control and overrunning or backlash of the spool and snarling or entanglement of the line thus effectively precluded.

Having thus described my invention, I claim:

1. In a fishing reel for attachment to a casting rod, a frame having spaced side members; a spool for a fishing line rotatively supported between the side members with capacity for free endwise play in either direction, said spool having trunnions respectively at opposite ends thereof; and rotation-restraining means including a disk of friction material affixed to one end of the spool, and a screw bushing to serve as a non-rotative braking element in which the trunnion at the last mentioned end of the spool is journaled, adjustable in the corresponding side member of the frame with its inner end confronting the friction disk on the reel whereby, with the axis of the spool positioned vertically and the friction disk contacting the non-rotative braking element, the spool is restrained to overcome the jerk caused by the whip effect of the rod in casting the line, whereby upon wrist movement of the rod through a partial turn to bring the reel into horizontal position, the retarding restraint upon the reel is gradually minimized and the reel eventually released for free rotation to permit free unwinding of the line, and whereby upon wrist movement of the rod in the opposite direction after the force of the cast is substantially expended, the spool is shifted axially by gravity and the friction disk thereon is again brought into contact with the non-rotative braking element and is thus retarded to prevent overrunning of the line.

2. A fishing reel according to claim 1, further including adjustable means for limiting the extent of axial movement of the spool to vary the degree of pressure contact between the friction disk on the reel and the confronting end of the bushing.

3. A fishing reel according to claim 1, further including adjustable means for limiting the extent of axial movement of the spool to vary the degree of pressure contact between the friction disk on the reel and the confronting end of the bushing, said adjustable means comprising a screw cap threadedly engaged upon the protruding outer end of the bushing; and a slide pin engaged by said cap and extending into the bore of the bushing into proximity to the end of the trunnion of the spool.

References Cited in the file of this patent

UNITED STATES PATENTS

| | | |
|---|---|---|
| 56,937 | Hartill | Aug. 7, 1866 |
| 360,758 | Calder | Apr. 5, 1887 |
| 496,654 | Heskett | May 2, 1893 |
| 1,626,357 | Rineholt | Apr. 26, 1927 |
| 1,973,686 | Maynes | Sept. 11, 1934 |
| 2,324,324 | Rutledge | July 13, 1943 |
| 2,478,111 | Kilian | Aug. 2, 1949 |

FOREIGN PATENTS

| | | |
|---|---|---|
| 18,212 | Great Britain | of 1908 |
| 351,693 | Great Britain | July 2, 1931 |